US 6,571,026 B2

(12) United States Patent
Kondo et al.

(10) Patent No.: US 6,571,026 B2
(45) Date of Patent: May 27, 2003

(54) TRAVELING WAVE OPTICAL MODULATORS AND A METHOD FOR THE PRODUCTION THEREOF

(75) Inventors: Atsuo Kondo, Okazaki; Jungo Kondo, Nishikamo-Gun; Kenji Aoki, Ogaki, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/738,176

(22) Filed: Dec. 15, 2000

(65) Prior Publication Data

US 2001/0004410 A1 Jun. 21, 2001

(30) Foreign Application Priority Data

Dec. 15, 1999 (JP) ............................................. 11-355614

(51) Int. Cl.$^7$ ............................. G02B 6/00; G02F 1/035
(52) U.S. Cl. ............................................. 385/2; 385/40
(58) Field of Search ................................ 385/1–4, 8, 9, 385/40, 41; 359/245

(56) References Cited

U.S. PATENT DOCUMENTS

| 4,184,738 | A  |   | 1/1980  | Wright |
|-----------|----|---|---------|--------|
| 5,455,876 | A  | * | 10/1995 | Hopfer et al. ................. 385/2 |
| 5,815,609 | A  | * | 9/1998  | Toyohara ....................... 385/2 |
| 6,069,729 | A  | * | 5/2000  | Gill et al. .................... 359/245 |
| 6,198,855 | B1 | * | 3/2001  | Hallemeier .................... 385/2 |

FOREIGN PATENT DOCUMENTS

| EP | 0 721 135 A1 | 7/1996  |
|----|--------------|---------|
| EP | 0 819 969 A2 | 1/1998  |
| JP | 3-229214     | 10/1991 |
| JP | 9-211402     | 8/1997  |

OTHER PUBLICATIONS

U.S. application No. 09/636,568, Kondo et al., filed Aug. 27, 2000.
U.S. application No. 09/738,174, Kondo et al., filed Dec. 15, 2000.
Mitomi O., et al., "Broadband and Low Driving–Voltage $LiNbO_3$ Optical Modulators," IEE Proceedings: Optoelectronics, Institution of Electrical Engineers, Stevenage, GB, vol. 145, No. 6, Dec. 15, 1998, pp. 360–364.

* cited by examiner

Primary Examiner—Frank G. Font
Assistant Examiner—Michael P. Mooney
(74) Attorney, Agent, or Firm—Burr & Brown

(57) ABSTRACT

A traveling wave optical modulator including an optical waveguide substrate made of a ferrodielectric electro-optic single crystal and having a pair of opposed main planes, an optical waveguide formed on one of the main planes, at least one pair of electrodes provided on the other main plane of the optical waveguide to apply a voltage for modulating a light propagating the optical waveguide, a fixing substrate bonded to said one of the main planes of the optical waveguide via an adhesive layer, said adhesive layer covering the optical waveguide and made of an adhering agent having a refractive index lower than that of the electro-optic single waveguide.

16 Claims, 8 Drawing Sheets

Polished 10μm, Line width 5.5μm (28-1)

TRAVELING WAVE OPTICAL MODULATORS AND A METHOD FOR THE PRODUCTION THEREOF

BACKGROUND OF THE INVENTION (1) Field of the Invention

The present invention relates to traveling wave optical modulators and a method for the production thereof.

(2) Related Art Statement

JP-A 9-211,402 discloses that an optical waveguide substrate is bonded to an underlying fixing substrate in the state that an optical waveguide is opposed to the fixing substrate. At that time, a groove is preliminarily formed in the fixing substrate, so that the optical waveguide is exposed to air inside the groove. Then, the optical waveguide substrate is ground to a reduced thickness, thereby decreasing the effective refractive index of microwaves.

However, according to the technique described in JP-A 9-211,402, it was difficult to reduce the thickness of the substrate in actually producing a modulator from a manufacturing standpoint. If the thickness of the substrate is not more than 20 μm, particularly not more than 10 μm, there is the possibility that the substrate is cracked around the optical waveguide or that working strain remains in the substrate. Further, if the thickness of the substrate is reduced to not more than 20 μm, an effect of confining a vertical component of light in the optical waveguide becomes stronger, so that the near field pattern of an optical waveguide is deformed flat. Therefore, mode shape mismatch increases between an optical waveguide and an external optical fiber, thereby leading to coupling loss. In this way, the prior art method has problems in reducing thickness of the substrate.

SUMMARY OF THE INVENTION

It is an object of the present invention to provide a traveling wave optical modulator for modulating a light propagating in an optical waveguide of an optical waveguide substrate made of a ferrodielectric electro-optic single crystal, which optical modulator effect high-speed modulation, prevent cracking and strain remaining in the substrate and also prevent deformation of the pattern of an optical waveguide mode. The present invention is also to provide a process for producing such a traveling wave optical modulator.

The traveling wave optical modulator according to the present invention comprises an optical waveguide substrate made of a ferrodielectric electro-optic single crystal and having a pair of opposed main planes, an optical waveguide formed on one of the main planes, at least one pair of electrodes provided on the other main plane of the optical waveguide substrate to apply a voltage for modulating a light propagating in the optical waveguide, a fixing substrate bonded to said one of the main planes of the optical waveguide substrate via an adhesive layer, said adhesive layer covering the optical waveguide being made of an adhering agent having a refractive index lower than that of the electro-optic single crystal.

A process for producing a traveling wave optical modulator comprising, (a) preparing a preform for an optical waveguide substrate, said preform being made of a ferrodielectric electro-optic single crystal and having a pair of opposed main planes, (b) forming an optical waveguide on one of the main planes, (c) bonding a fixing substrate to said one of the main planes of the optical waveguide substrate via an adhesive layer, adhesive being made of an adhering agent having a refractive index lower than that of the electro-optic single crystal and covering the optical waveguide at this time, (d) working the other main plane of the substrate preform to reduce its thickness for the formation of an optical waveguide substrate, and (e) forming at least one pair of electrodes on the other main plane of the optical waveguide substrate to apply a voltage for modulating a light propagating in the optical waveguide.

In the present invention, the following are preferable embodiments of the present invention.
(1) The traveling wave optical modulator is adapted to propagate a TE mode light through the optical waveguide.
(2) The thickness of the optical waveguide substrate is not more than 20 μm.
(3) The fixing substrate is made of a material having a dielectric constant and a dielectric loss smaller than those of the electro-optic single crystal, respectively.
(4) The thickness of the adhesive layer is not less than 20 μm, and the fixing substrate is made of a material having a dielectric constant and a dielectric loss not smaller than those of the electro-optic single crystal, respectively.
(5) The electro-optic single crystal is one or more single crystals from the group consisting of a lithium niobate single crystal, a lithium tantalate single crystal and a lithium niobate-lithium tantalate solid solution single crystal.

The following is a preferable embodiment of the process for the production of the traveling wave optical modulator. That is, the thickness of the optical waveguide is not more than 20 μm.

These and other objects, features and advantages of the present invention will be appreciated reading the following description of the invention when taken in conjunction the attached drawings, with the understanding that some modifications, variations and changes could be made by the skilled person in the art to which the invention pertains.

BRIEF DESCRIPTION OF THE DRAWINGS

For a better understanding of the invention, reference is made to the attached drawings, wherein.

DESCRIPTION OF THE INVENTION

Figure 1A:
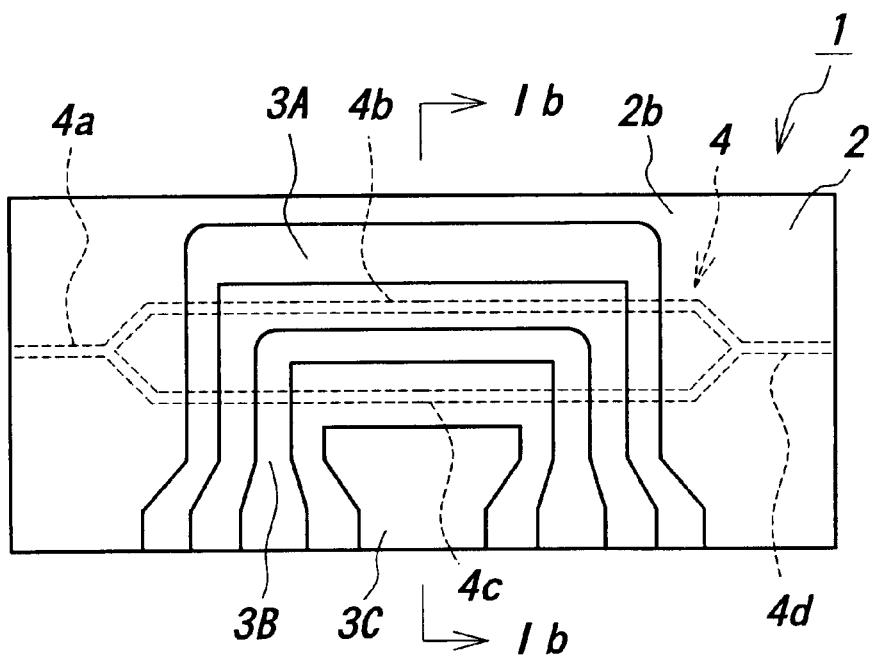
FIG. 1(a) is a plane view schematically showing a traveling wave optical modulator 1 according to one embodiment of the preset invention, FIG. 1(b) being a sectional view schematically showing the modulator 1.

According to the present invention, the optical waveguide substrate is made of a ferrodielectric electro-optic optical single crystal. Such a crystal is not limited to any particular one so long as the optical modulation is possible, but lithium niobate, potassium lithium niobate, lithium tantalate, KTP, glass, silicon GaAs, and quartz may be recited. Particularly, one or more kinds of single crystals selected from the group consisting of a single crystal of lithium niobate, a single crystal of lithium tantalate and a solid solution single crystal of lithium niobate-lithium tantalate are preferred. As the substrate, single crystals having an X-orientation, a Y-orientation and a Z- orientation may be employed.

The optical waveguide substrate has opposed main planes. Although the substrate is not limited to any particular shape, it is ordinarily of a rectangular parallelopiped shape. In the present invention, the thickness of the optical waveguide substrate is preferably not more than 20 μm, and more preferably not more than 10 μm. By so setting, the effective refractive index of microwaves (nmw) can be conspicuously reduced. Further, the thickness of the optical waveguide substrate preform is preferably not less than 300 μm from the standpoint of manufacturing. On one of the main planes, an optical waveguide having a given shape, for example, an optical waveguide of a Mach- Zehnder type is formed by using a known method such as a titanium-diffusing method or a proton- exchanging method. The Mach-Zehnder type optical waveguide comprises an input optical waveguide portion, a pair of branched optical waveguide portions branched from a forwarding end of the input one, and a coupled optical waveguide portion to which forwarding ends of the branched ones are united.

A set of electrodes are formed on the other main plane of the substrate by using a known method such as a photolithography method. The configuration and arrangement of the electrodes may be selected depending upon whether the optical waveguide substrate is made of the X-oriented, Y-oriented or Z-oriented single crystal. For example, if the optical waveguide is of a Mach-Zehnder type formed on the X- or Y-oriented plate, it is formed on the substrate such that a main portion of a signal electrode is located between and in parallel to the branched optical waveguides as viewed in plane, and main portions of ground electrodes are located to each sandwich the corresponding branched optical waveguide between and in parallel to the signal electrode. If a single high frequency circuit is to be located at one side of the substrate, both end portions of remote ground electrode extend to this one side crossing the branched optical waveguides, whereas both end portions of the signal electrode extend to this one side crossing one branched optical waveguide. The near ground electrode also extends to this one side of the substrate. In this case, a TE mode light is propagated through optical waveguide.

The other main plane of the substrate is exposed to air. The above one of the main planes of substrate is bonded to a main plane of the fixing substrate via a bonding layer made of an adhesive, and the optical waveguide is covered with the adhesive layer.

The fixing substrate is preferably made of a material having a dielectric constant and a dielectric loss smaller than those of the electro-optic single crystal, respectively. Such a material may include glass, such as quartz glass. If the fixing substrate is made of such a material, an adverse effect of the fixing substrate upon the propagating speed of the microwaves can be prevented even if the thickness of the adhesive layer is not more than 20 μm, further not more than 10 μm.

Further, the fixing substrate may be made of a material having a dielectric constant and a dielectric loss not smaller than those of the electro-optic single crystal of the optical waveguide substrate, respectively. In this case, it is particularly preferred to make the fixing substrate from the same material as that of the optical waveguide substrate 2. In this case, the thickness of the adhesive layer is particularly preferably not less than 20 μm in preventing the effect of the fixing substrate upon the propagation of the microwaves.

The adhesive needs to have a refractive index lower than that of the electro-optic single crystal of the optical waveguide substrate. In addition, the dielectric constant and the dielectric loss of the adhesive are preferably lower than those of the electro-optic single crystal of the substrate, respectively.

Although adhesive is not limited to any particular one so long as the above requirements satisfied, materials having an electro-optic effect, such as an epoxy-based adhesive, a thermosetting adhesive, a ultraviolet curable adhesive and ALON Ceramics C (tradename, manufactured by Toa Synthesis Co., Ltd.) having a coefficient of thermal expansion relatively near to that of lithium niobate may be recited.

The thickness of the adhesive layer is not less than 5 μm in absorbing mechanical stress vibration on polishing a substrate perform. Further, the thickness is preferably not less than 10 μm from the standpoint of production.

Figure 1B:
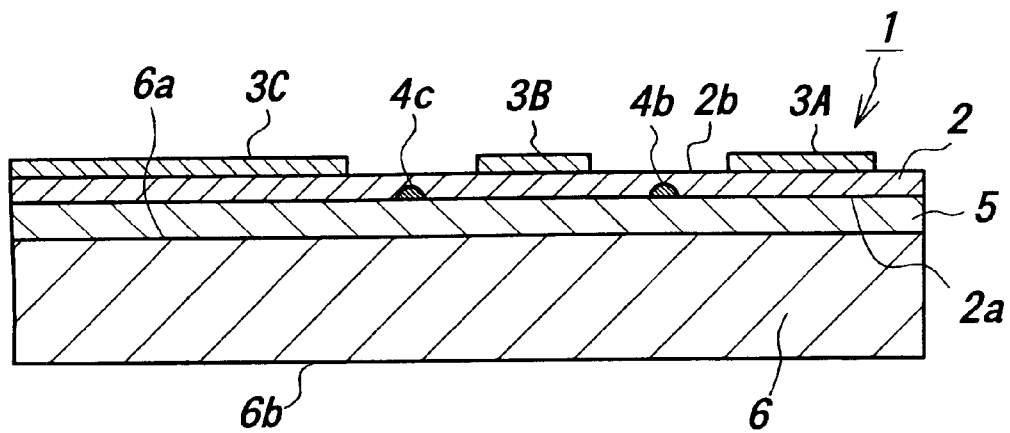

FIG. 1(a) a plane view schematically illustrating a traveling wave optical modulator 1 according to an embodiment of the present invention, and FIG. 1(b) is a sectional view schematically illustrating the modulator 1 taken along line Ib-Ib of FIG. 1(a).

The modulator comprises a substrate made of a ferrodielectric electro-optic single crystal as mentioned above and having a pair of opposed main planes 2a and 2b. One of the main 2a, is formed with an optical waveguide 4, for example, of the Mach-Zehnder type. In this embodiment, the optical waveguide comprises an input optical waveguide portion 4a, branched optical waveguide portions 4b, 4c and a coupled optical waveguide portion 4d.

The other main plane 2b of the substrate 2 is formed with electrodes 3A, 3B and 3C having a given configuration as shown. In this embodiment for example, an X-oriented plate or a Y-oriented plate made of lithium niobate is used as the substrate 2. Therefore, a TE mode light is to be propagated through the optical waveguide. The branched optical waveguide portions are located at respective gap zones between the adjacent electrodes 3A to 3C.

The other main plane 2b of the substrate 2 faces air. The above one of the main planes, 2a, of the substrate 2 is bonded to a main plane 6a of a fixing substrate 6 via an adhesive layer 5 made of an adhesive, as explained above. A bottom surface of the fixing substrate 6 is denoted by a reference numeral 6b. The adhesive layer 5 covers the branched optical waveguide portions 4b, 4c.

Figure 2A:
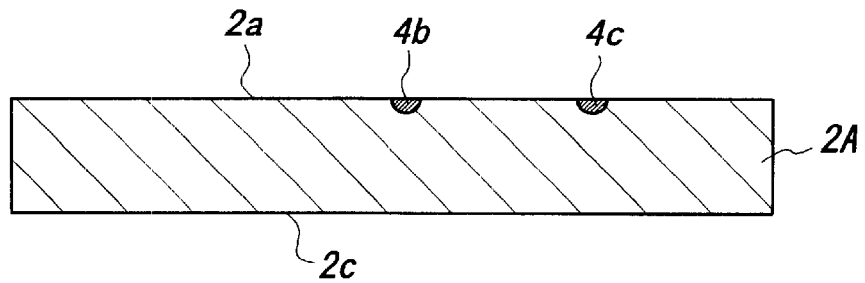
FIGS. 2(a), 2(b) and 2(c) are sectional views schematically showing a process for producing the modulator in FIGS. 1(a) and 1(b)
Figure 2B:
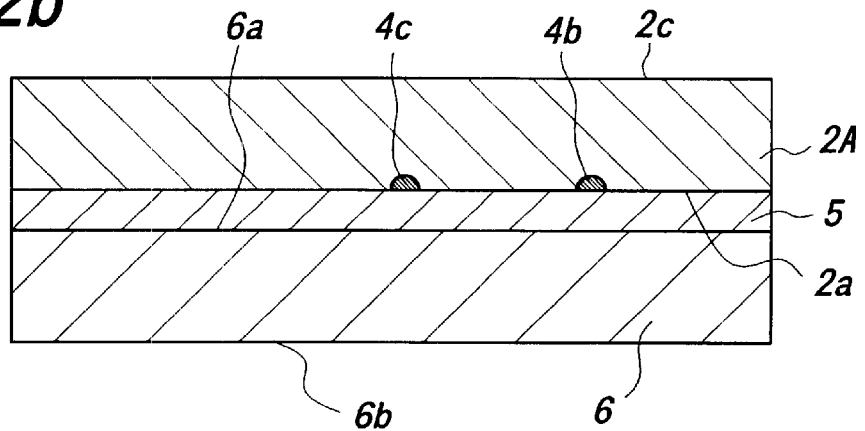
Figure 2C:
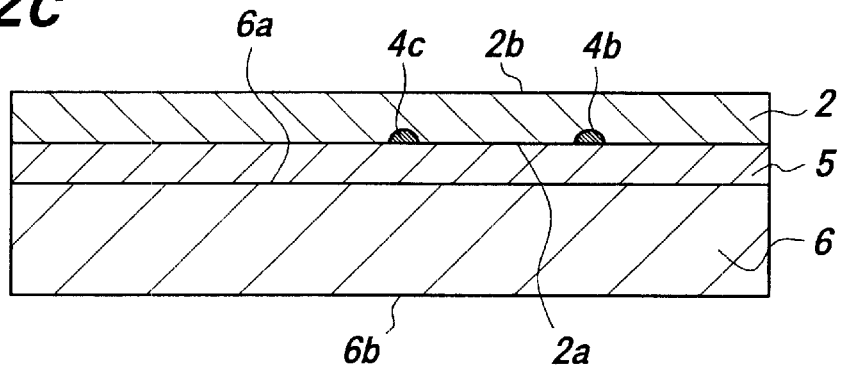

Then, a process for producing the above-mentioned traveling wave optical modulator according to the present invention will be outlined with reference to FIG. 2(a) to FIG. 2(c).

A substrate perform 2A having a pair of opposed main planes 2a, 2c is formed from a ferrodielectric electro-optic single crystal and then washed. An optical waveguide 4 is formed at a side of one of the main planes, 2a, of the substrate 2A (FIG. 2(a)). In FIG. 2(a) to FIG. 2(c), the Mach-Zehnder type optical waveguide is shown, and a pair of branched optical waveguide portions 4b, 4c are shown in section. A known process such as a titanium-diffusing method or a proton-exchanging method may be employed at this time. Next, a fixing substrate 6 is bonded to the one main plane 2a of the substrate perform 2A via an adhesive layer 5 made of an adhesive having a refractive index smaller than that of the electro-optic single crystal constituting the substrate perform. At this time, the optical waveguide 4 is covered with the adhesive layer 5 (FIG. 2(b)).

Thereafter, the other main plane 2c of the substrate perform 2A is worked to a reduced thickness, thereby forming an optical waveguide substrate 2 (FIG. 2(c)). Then, at least one pair of electrodes 3A to 3C are formed on the other main plane of the other main plane 2b of the optical waveguide substrate 2 by vapor deposition or plating so as to apply voltage for modulating the light propagating through the optical waveguide 4 (FIG. 1(a) and FIG. 1(b)).

Since the thickness of the optical waveguide substrate can be made extremely small in such a traveling wave optical modulator 1, modulation can be effected at a high speed. Further, since the branched optical waveguide portions 4b, 4c (the gap area among the electrodes 3A to 3C) are covered with the adhesive layer 5 at the opposite side of the substrate to the polished surface 2b of the substrate, impact on polishing can be absorbed, so that strain can be prevented from remaining inside the substrate 2. Moreover, since the optical wave guide portions 4b, 4c are covered with the adhesive layer, the pattern of the optical waveguide mode can be prevented from being excessively flat in a vertical direction, and the coupling loss between an external optical waveguide and an optical fiber array can be prevented from increasing.

Figure 3:
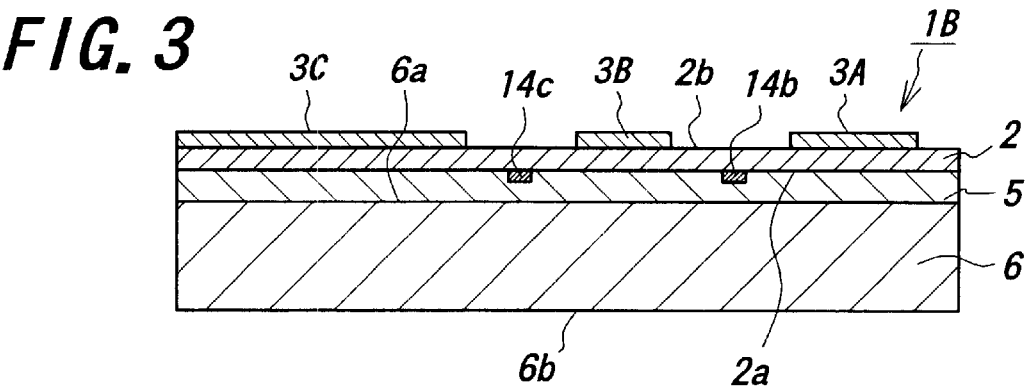
FIG. 3 is plane view schematically showing a traveling wave optical modulator 1A according to another embodiment of the present invention.

FIG. 3 a sectional view schematically illustrating another traveling wave optical modulator 1B according to a second embodiment of the present invention. Since this 1B is similar to that 1A in FIGS. 1(a) and 1(b), explanation on those constituent portions as already shown in FIGS. 1(a) and 1(b) are omitted here.

In the modulator 1B, an optical waveguide 4 of a ridge type is formed on one of the main planes, 2a, of the substrate 2. In FIG. 3, ridge-type branched optical waveguide portion 4a, 4b are sectionally shown in FIG. 3, projecting from the surface of the main plane 2a of the substrate 2. Each of the branched optical waveguide portions 14b, 14c is projecting and buried in the adhesive layer 5.

Examples

In the following, more concrete experimental results are shown.

Production of a traveling wave optical modulator according to Inventive Example:

An X-cut starting substrate perform made of a single crystal of LiNbO$_3$ ground at a main plane to a thickness of a substrate perform of 300 μm. Then, a traveling wave optical modulator 1 as shown in FIGS. 1(a) and 1(b) was produced according to the procedure explained with reference to FIGS. 2(a) to 2(c). More specifically, an optical waveguide 4 of a Mach-Zehnder type was formed on one of main planes, 2a, the substrate perform according to the titanium-diffusing method or a photolithography method. This substrate perform was bonded to a fixing substrate 6 made of quartz glass with an adhesive having a low dielectric constant. Then, a main plane 2b of the resulting wafer was polished with a general purpose-use polisher, thereby reducing optical waveguide substrate to a thickness of 10 μm. Thereafter, end faces of the optical waveguide were optically polished. Subsequently, electrodes 3A to 3C were formed of gold on the main plane 2b of the substrate 2 according to the photolithography method.

The thickness of the fixing substrate was 500 μm, and a gap between adjacent electrodes 26 μm, and the width of the central electrode 3B was 10 μm. The thickness of the adhesive layer was 20 μm.

The width of the titanium pattern formed on the substrate perform in the titanium-diffusing process was set among 5.5, 6.0 and 6.5 μm.

Figure 9:
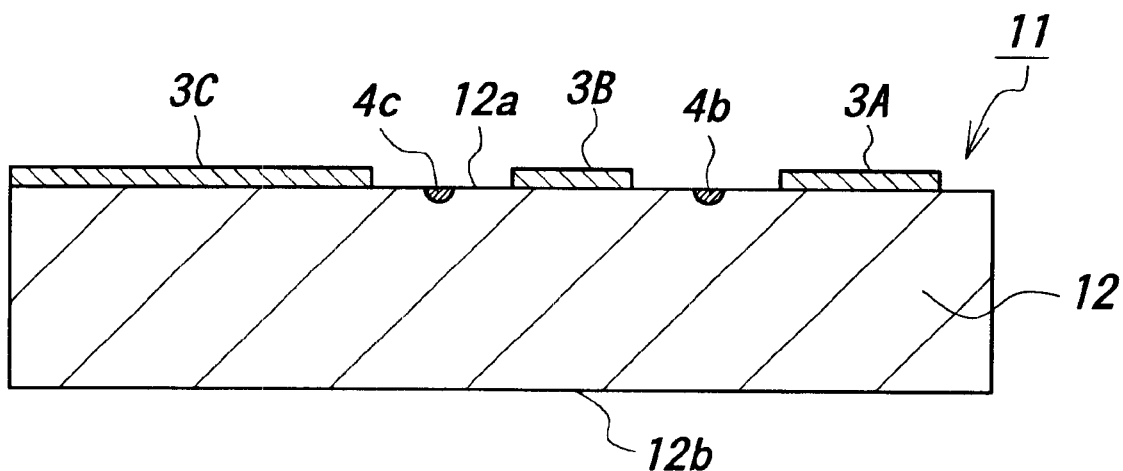
FIG. 9 is sectional view schematically showing a conventional traveling wave optical modulator as a Comparative Example.

Production of traveling wave optical modulator as Comparative Examples:

As Comparative Examples, a traveling wave optical waveguide 11 having a configuration as shown in FIG. 9 was produced. A substrate perform was not bonded to a fixing substrate, and the thickness of an optical waveguide substrate 12 was 500 μm. At a side of one main plane 12a of an optical waveguide substrate 12 were formed an optical waveguide 4 (branched optical waveguide portions 4b, 4c are shown in FIG. 9) and electrodes 3A to 3C. The other main plane is denoted by 12b. The materials of the optical waveguide substrate and the optical waveguide, the dimensions of the electrodes, etc., are the same as in the above mentioned Inventive Examples.

Figure 4:
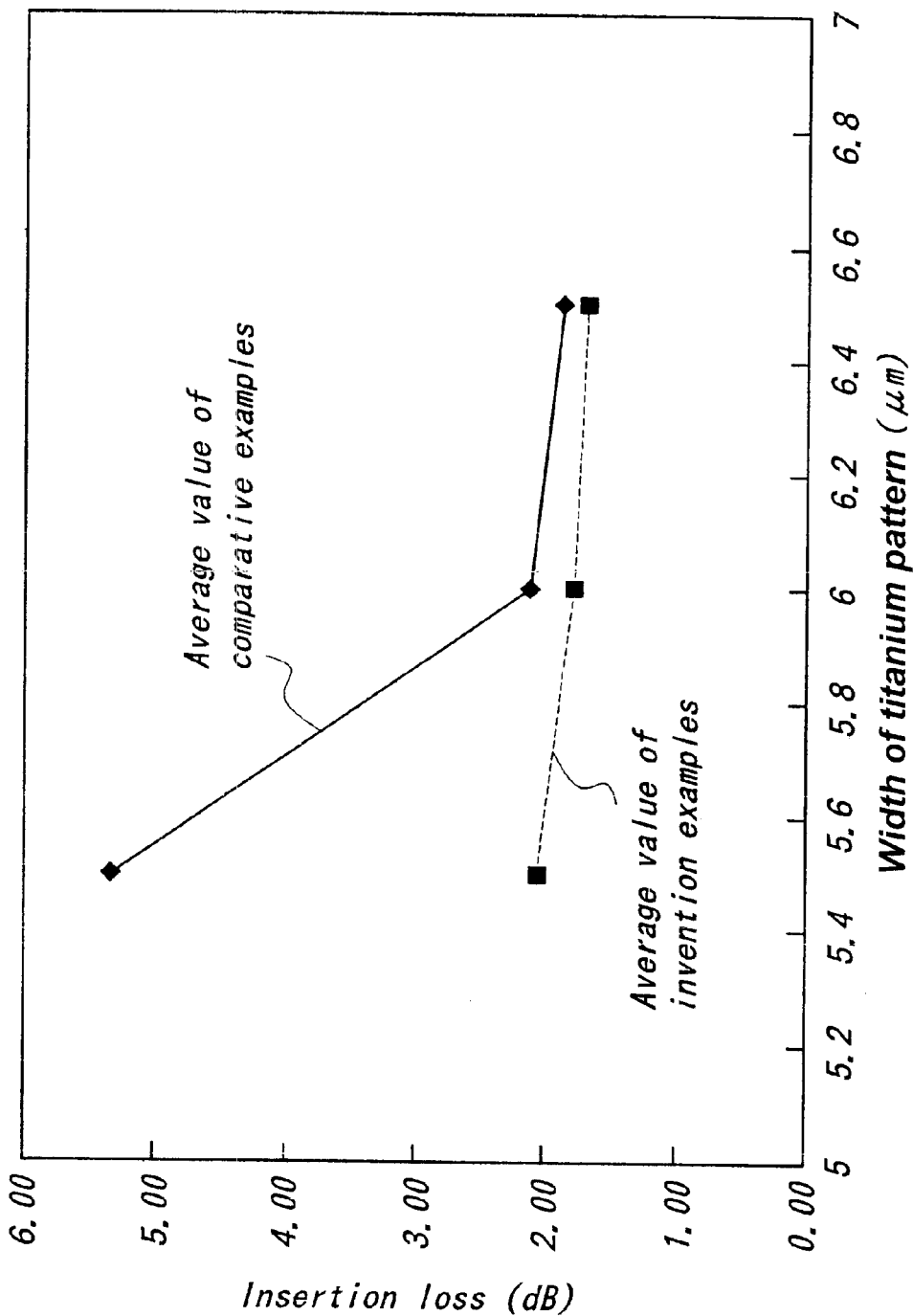
FIG. 4 is graph for comparing insertion losses between modulators of an Inventive Example and a Comparative Example (FIG. 9)

Measurement:

A single-core fiber array holding a single mode optical fiber for 1.5 μm wavelength use was prepared, and coupled to the modulator. While the optical fiber was aligned with the optical waveguide, bonding was effected with an ultraviolet-curable resin. With respect to the modulators of the Inventive Examples and Comparative Examples, the insertion loss was measured, and results are shown in FIG. 4. The modulator of the Inventive Examples in which the optical waveguide substrate was polished to a thickness of 10 μm is compatible with non-polished ones in the Comparative Examples in terms of the insertion loss. In particular, when the titanium pattern had a width of 5.5 μm, the inventive modulator had an insertion loss far smaller and is more stable as compared with the Comparative Examples. This is considered that when the width of the titanium pattern is 5.5 μm, the modulator in the Comparative Examples approaches a cut-off zone.

Figure 5:
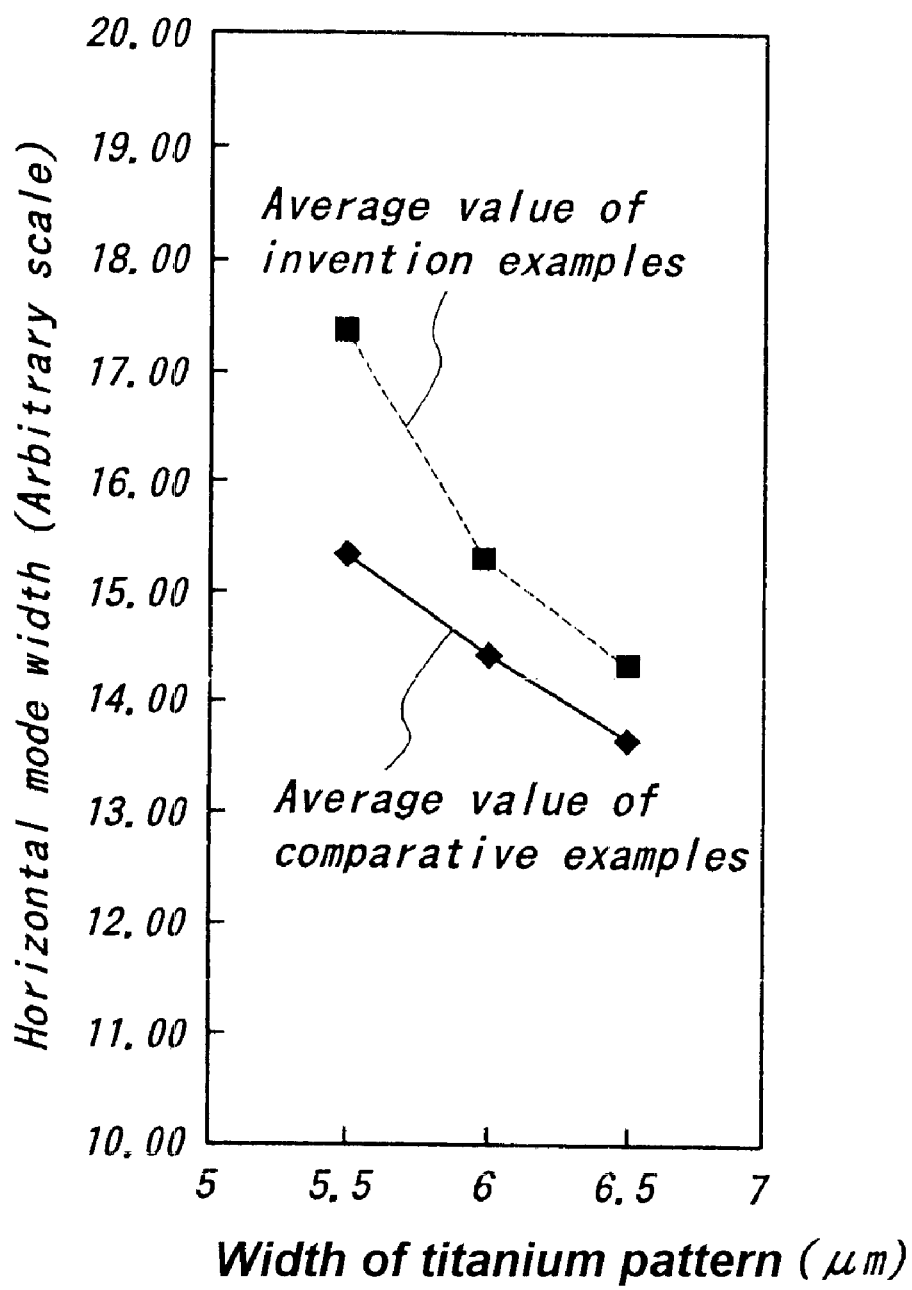
FIG. 5 is a graph showing the relationship between the horizontal mode size of the light and the width of the titanium pattern with respect to the modulators of an Inventive Example and a Comparative Example.
Figure 6:
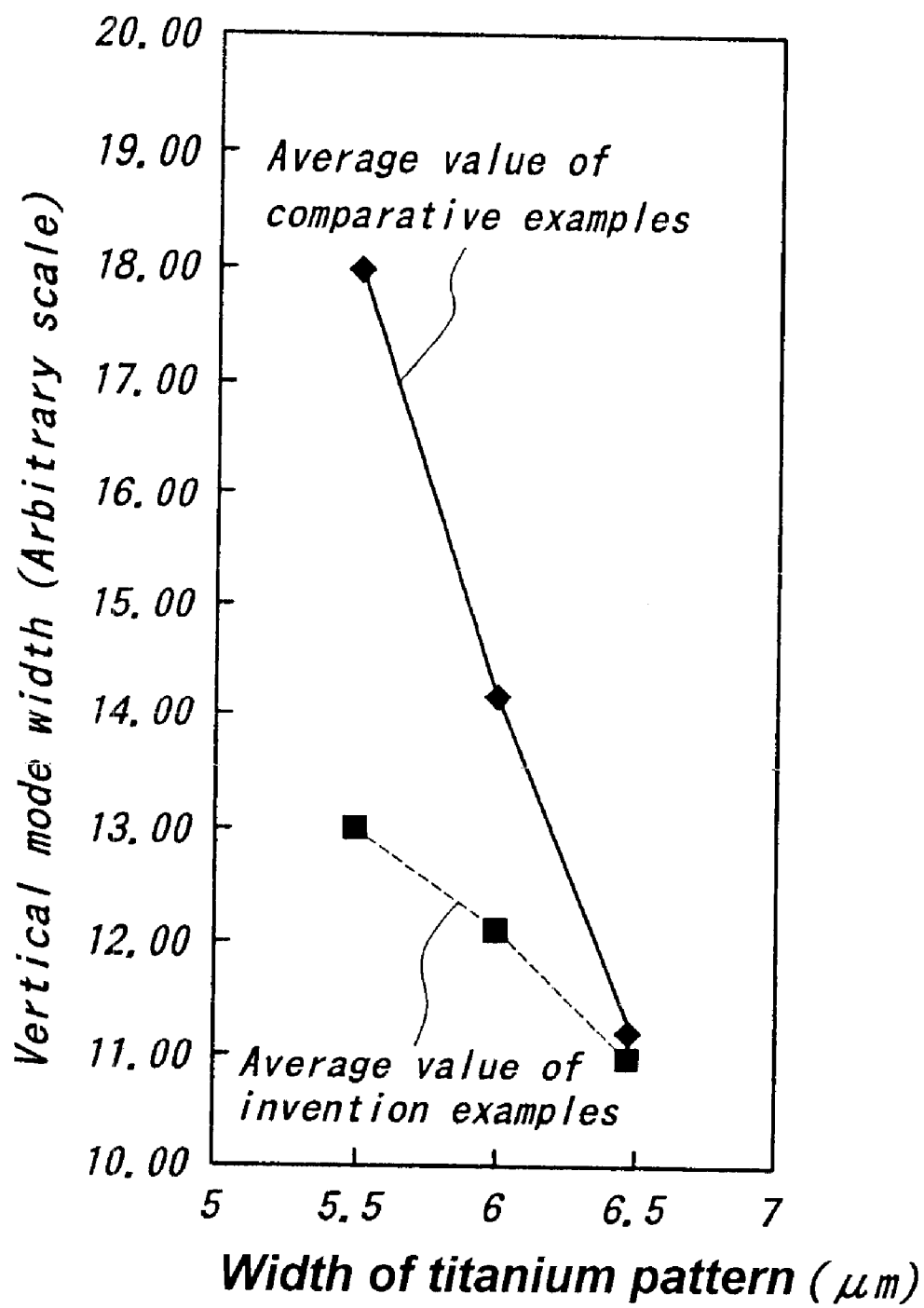
FIG. 6 is a graph showing the relationship between the vertical mode size of the light and the width of the titanium pattern with respect to the modulators of an Inventive Example a Comparative Example.

FIG. 5 is a graph showing the relationship between the mode width in the horizontal orientation and the width of the titanium pattern with respect to the Inventive Examples and Comparative Examples. On the other hand, FIG. 6 is a graph showing the relationship between the mode width in the vertical orientation and the width of the titanium pattern with respect to Inventive Examples and Comparative Examples. When the width of the titanium pattern is within a range of 5.5 μm to 6.5 μm, the modulator in the Inventive Examples has a relative rate between the width of the horizontal mode width and the vertical mode width and is more stabilized as compared with the modulator in the Comparative Examples. Further, although there is a tendency that the horizontal mode width in the modulator in the Inventive Examples is slightly larger than that of the modulator in the Comparative Examples, a difference between them is not so large.

Figure 7:
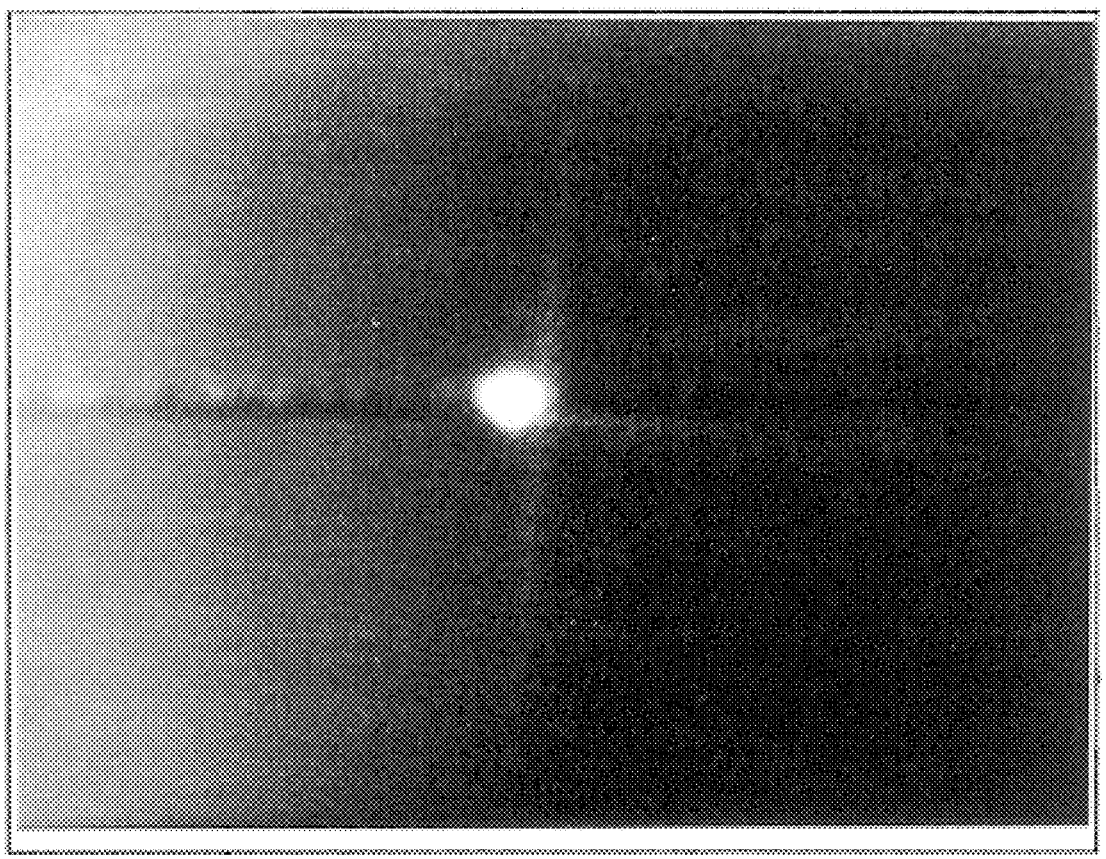
FIG. 7 is a photograph showing a pattern of an emitted light of the modulator of the Inventive Example.

FIG. 7 is a photograph showing a pattern of a light emitted from the modulator, of one of the Inventive Examples having the width of the titanium pattern of 5.5 μm. As is clear from this photograph, an excellent wave-propagating mode was observed even when the modulator is near the cut-off zone (Width of titanium pattern: 5.5 μm).

Figure 8:
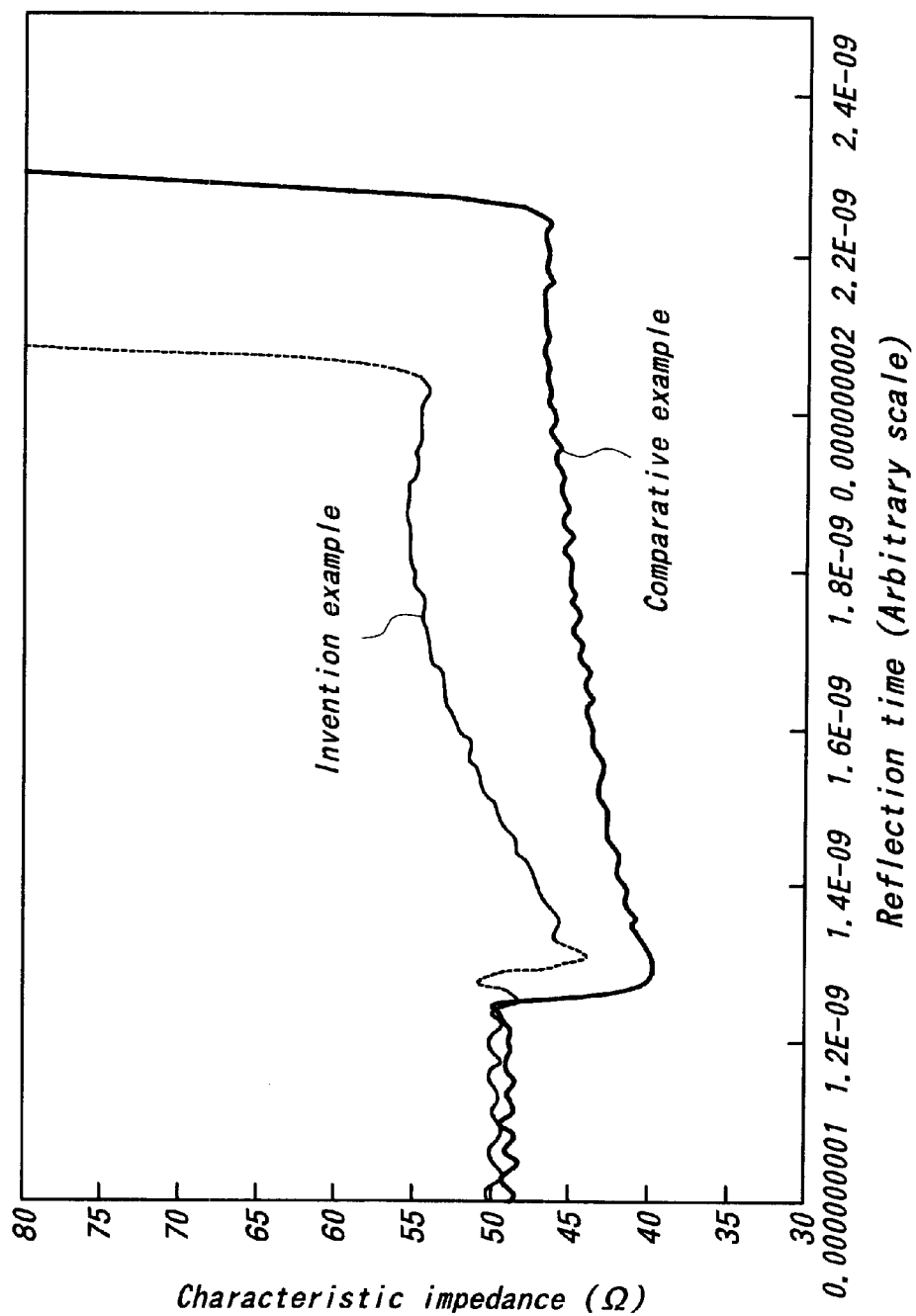
FIG. 8 is a graph showing the relationship between the characteristic impedance and the reflection time with respect to the modulators of the Inventive Example and a Comparative Example.

Further, the respect to the modulators of the Inventive Examples and Comparative Examples, TDR measurements were effected, and results thereof are shown in FIG. 8. As is clear from these results, according to the modulator in the Inventive Examples, time required for the reflection is shortened, and the speed of the microwaves propagating through the electrodes is accelerated.

As mentioned above, the modulator according to the present invention has an excellent wave-propagating mode, is stable and free from any increase in the insertion loss resulting from strain, and can accomplish an extremely high microwave-propagating speed.

What is claimed is:

1. A traveling wave optical modulator comprising an optical waveguide substrate made of a ferrodielectric electro-optic single crystal and having a pair of opposed main planes, an optical waveguide on one of the main planes, at least one pair of electrodes provided on the other main plane of the waveguide substrate to apply a voltage for modulating a light propagating in the optical waveguide, a fixing substrate bonded to said one of the main planes of the optical waveguide via an adhesive layer, said adhesive layer covering the optical waveguide and being made of an adhering agent having a refractive index lower than that of the electro-optic single crystal.

2. The traveling wave optical modulator set forth in claim 1, which is adapted to propagate a TE mode light through the optical waveguide.

3. The traveling wave optical modulator set forth in claim 1, wherein the thickness of the optical waveguide substrate is not more than 20 $\mu$m.

4. The traveling wave optical modulator set forth in claim 1, wherein the fixing substrate is made of a material having a dielectric constant smaller than that of the electro-optic single crystal.

5. The traveling wave optical waveguide set forth in claim 1, wherein the thickness of the adhesive layer is not less than 20 $\mu$m, and the fixing substrate is made of a material having a dielectric constant not smaller than that of the electro-optic single crystal.

6. The traveling wave optical waveguide set forth in claim 1, wherein the electro-optic single crystal is one or more single crystals selected from the group consisting of a lithium niobate single crystal, a lithium tantalate single crystal and a lithium niobate-lithium tantalate solid solution single crystal.

7. A process for producing a traveling wave optical modulator comprising:

preparing a preform for an optical waveguide substrate, said preform being made of a ferrodielectric electro-optic single crystal and having a pair of opposed main planes;

forming an optical waveguide on one of the main planes;

bonding a fixing substrate to said one of the main planes of the optical waveguide substrate via an adhesive layer, said adhesive being made of an adhering agent having a refractive index lower than that of the electro-optic single crystal and covering the optical waveguide at this time;

working the other main plane of the substrate preform to reduce its thickness for the formation of an optical waveguide substrate; and forming at least one pair of electrodes on the other main plane of the optical waveguide substrate to apply a voltage for modulating light propagating in the optical waveguide.

8. The traveling wave optical modulator set forth in claim 7, wherein the thickness of the optical waveguide is not more than 20 $\mu$m.

9. The traveling wave optical modulator set forth in claim 2, wherein the thickness of the optical waveguide in not more than 20 $\mu$m.

10. The traveling wave optical modulator at forth in claim 2, wherein the fixing substrate is made of a material having a dielectric constant smaller than that of the electro-optic single crystal.

11. The traveling wave optical waveguide set forth in claim 2, wherein the thickness of the adhesive layer is not less than 20 $\mu$m, and the fixing substrate is made of a material having a dielectric constant not smaller than that of the electro-optic single crystal.

12. The traveling wave optical waveguide set forth in claim 2, wherein the electro-optic single crystal is one or more single crystals selected from the group consisting of a lithium niobate single crystal, a lithium tantalate single crystal and a lithium niobate-lithium tantalate solid solution single crystal.

13. The wave optical modulator set forth in claim 1, wherein the fixing substrate is made of a material having a dielectric loss smaller than that of the electro-optic single crystal.

14. The traveling wave optical waveguide set forth in claim 1, wherein the thickness of the adhesive layer is not less than 20 $\mu$m, and the fixing substrate is made of a material having a dielectric loss not smaller than that of the electro-optic single crystal.

15. The traveling wave optical modulator set forth in claim 2, wherein the fixing substrate is made of a material having a dielectric loss smaller than that of the electro-optic single crystal.

16. The traveling wave optical waveguide set forth in claim 2, wherein the thickness of the adhesive layer is not less than 20 $\mu$m, and the fixing substrate is made of a material having a dielectric loss not smaller than that of the electro-optic single crystal.

* * * * *